(12) United States Patent
Huang et al.

(10) Patent No.: US 11,098,615 B2
(45) Date of Patent: Aug. 24, 2021

(54) POWER CYCLE SYSTEMS AND METHODS

(71) Applicant: GAS TECHNOLOGY INSTITUTE, Des Plaines, IL (US)

(72) Inventors: Megan Huang, Sherman Oaks, CA (US); Anthony Eastland, Moorpark, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 232 days.

(21) Appl. No.: 15/711,606

(22) Filed: Sep. 21, 2017

(65) Prior Publication Data

US 2018/0080348 A1 Mar. 22, 2018

Related U.S. Application Data

(60) Provisional application No. 62/398,168, filed on Sep. 22, 2016.

(51) Int. Cl.
| | |
|---|---|
| *F01K 25/14* | (2006.01) |
| *F23B 80/00* | (2006.01) |
| *F02C 6/18* | (2006.01) |
| *F01K 23/10* | (2006.01) |

(Continued)

(52) U.S. Cl.
CPC .............. *F01K 25/14* (2013.01); *F01K 23/10* (2013.01); *F02C 1/007* (2013.01); *F02C 6/18* (2013.01); *F23B 80/00* (2013.01); *F01K 7/16* (2013.01); *F05D 2240/35* (2013.01); *F05D 2260/20* (2013.01)

(58) Field of Classification Search
None
See application file for complete search history.

(56) References Cited

U.S. PATENT DOCUMENTS

| | | | |
|---|---|---|---|
| 3,971,211 A | | 7/1976 | Wethe et al. |
| 4,498,289 A | * | 2/1985 | Osgerby ............... F01K 25/103 60/39.17 |

(Continued)

FOREIGN PATENT DOCUMENTS

| | | |
|---|---|---|
| PL | 415180 | 6/2017 |
| PL | 415182 | 6/2017 |

OTHER PUBLICATIONS

M. Bahrami, ENSC 461 tutorial, 2012, p. 1-9.*

(Continued)

*Primary Examiner* — Steven M Sutherland
*Assistant Examiner* — Rodolphe Andre Chabreyrie
(74) *Attorney, Agent, or Firm* — Pauley Erickson & Swanson

(57) ABSTRACT

Methods and systems of power generation that integrate $SCO_2$ Brayton and Rankin steam power cycles with fossil fuel combustion, One such method involves combusting a fuel material with an oxidizer material in a combustor to produce heat and a combustion exhaust. At least a portion of the combustion exhaust and a first portion of heat produced by the combustion processing are fed to a $SCO_2$ Brayton power cycle to produce power and a second exhaust. At least a portion of the second exhaust and a second portion of heat produced by the combustion processing are feed to a steam Rankine power cycle to produce additional power and a third exhaust.

15 Claims, 3 Drawing Sheets

(51) Int. Cl.
*F02C 1/00* (2006.01)
*F01K 7/16* (2006.01)

(56) References Cited

U.S. PATENT DOCUMENTS

| | | | |
|---|---|---|---|
| 6,263,664 B1* | 7/2001 | Tanigawa | F23R 3/005 60/39.54 |
| 6,772,581 B2* | 8/2004 | Ojiro | F01D 11/24 415/114 |
| 9,567,876 B2 | 2/2017 | Stewart et al. | |
| 2005/0279333 A1* | 12/2005 | Kweon | F02M 33/00 123/557 |
| 2009/0180969 A1* | 7/2009 | Bonelli | A61K 31/439 424/45 |
| 2012/0174558 A1 | 7/2012 | Gurin | |
| 2012/0216536 A1 | 8/2012 | Ma et al. | |
| 2013/0269345 A1* | 10/2013 | Sonwane | F01K 25/103 60/645 |
| 2014/0060002 A1* | 3/2014 | Sonwane | F02C 1/10 60/39.182 |
| 2014/0338901 A1* | 11/2014 | Sites | E21B 43/006 166/268 |
| 2016/0010513 A1 | 1/2016 | Kang et al. | |
| 2016/0047361 A1 | 2/2016 | Al-Sulaiman | |

OTHER PUBLICATIONS

PCT International Search Report, Form PCT/ISA/210, dated Nov. 30, 2017, (2 pages).
PCT Written Opinion of the International Searching Authority, Form PCT/ISA/237, dated Nov. 30, 2017, (5 pages).
Polish Patent Office, Polish Search Report for Polish Patent Application No. P. 430628 dated Aug. 6, 2019 (2 pages).
China Patent Office, "Notice of First Office Action and Search Report," for Chinese Patent Application 201780057543.9, dated Jan. 22, 2021.

* cited by examiner

POWER CYCLE SYSTEMS AND METHODS

CROSS REFERENCE TO RELATED APPLICATION

This application claims the benefit of U.S. Provisional Patent Application Ser. No. 62/398,168, filed on 22 Sep. 2016. The Provisional Application is hereby incorporated by reference herein in its entirety and is made a part hereof, including but not limited to those portions which specifically appear hereinafter.

BACKGROUND OF THE INVENTION

Field of the Invention

This invention relates generally to power cycles such as for use with fossil fuel heat sources and, more particularly, to high efficiency versions of such power cycles.

In one embodiment, a new configuration for a high efficiency power plant utilizing both supercritical $CO_2$ technology (SCOT) and steam Rankine technology is provided.

Discussion of Related Art

Fossil fuel applications typically have or produce high combustion temperatures; thus, they can provide a wide range of thermal energy (e.g., from ~2500° F. down to 200° F.) for application to a power cycle. Current coal power plants commonly utilize only a steam Rankine cycle and have net plant efficiencies of about 32.5% with carbon capture. A benefit of using a steam Rankine cycle is its ability to handle a large temperature delta of a heat source through extensive heat integration and pre-heating of the boiler feed water. Downsides associated with steam cycles, however, are low plant efficiencies and larger than might be desired required footprints for such systems.

There has been a push to utilize supercritical $CO_2$ (SCO2) in place of steam due to its high power density which allows for a smaller footprint. As a result of the relatively high density of CO2 at supercritical conditions and the smaller turbine pressure ratio used in the SCO2Brayton cycle, facilities relying on such SCO2 technology can be compact. Also, since much of the heat is recuperated within the SCO2 cycle itself, the efficiency of such a SCO2 cycle is much higher than that of a steam cycle. Thus, the SCO2 Brayton cycle can positively address the issues of low efficiency and large footprint.

However, a downside of the SCO2 Brayton cycle is that it typically does not integrate well with fossil fuel heat sources. Since much heat is recuperated within the cycle itself, the range of temperature over which heat is added into a SCO2 cycle is small; thus, much of the lower grade heat available in or from a fossil heat source is unusable with a SCO2 Brayton cycle only processing or systems. That is, when integrating with a fossil heat source, much of the lower grade heat produced or resulting from the fossil heat source is unusable in a SCOT cycle. While various SCO2 Brayton cascaded cycles can be designed in an effort to incorporate more of the low grade heat, the issue remains that heat below 400° F. is commonly left unused. This results in an undesirable reduction in overall plant efficiency.

SUMMARY OF THE INVENTION

A general object of the subject development is to provide improved methods and systems for generating power.

A more specific objective of the invention is to overcome one or more of the problems described above.

A more specific objection of at least selected aspect of the subject development is to provide methods and systems for generating power, particularly power from fossil fuel materials and which methods and systems desirably better or more efficiently utilize thermal energy produced or resulting from fossil fuel materials, such as by more greatly or better utilizing low grade heat such as compared to processing that exclusively relies on SCO2 Brayton cycle processing.

In accordance with one aspect of the subject development methods for generating power are provided.

In accordance with one embodiment, one such method involves combusting a fuel material with an oxidizer material in a combustor to produce heat and a combustion exhaust. At least a portion of the combustion exhaust and a first portion of heat produced by the combustion processing are fed to a $SCO_2$ Brayton power cycle to produce power and a second exhaust. At least a portion of the second exhaust and a second portion of heat produced by the combustion processing are feed to a steam Rankine power cycle to produce additional power and a third exhaust.

In accordance with another aspect of the subject development power plant systems are provided.

In accordance with one embodiment, one such power plant system includes a combustor for combusting a fuel material with an oxidizer material to produce heat and a combustion exhaust, a $SCO_2$ Brayton power cycle to utilize the combustion exhaust and a first portion of heat produced by the combustor to produce power and a second exhaust; and a steam Rankine power cycle to utilize the second exhaust and a second portion of heat produced by the combustor to produce additional power and a third exhaust.

Thus, in accordance with one aspect of the development, as further detailed below, methods and systems are desirably provided which utilize low grade heat by including a steam Rankine cycle, while utilizing the higher grade heat in a higher efficiency SCO2 Brayton cycle; improving overall performance. Thus, the subject development can desirably serve to transfer as much heat as possible to a high efficiency $SCO_2$ Brayton power cycle while reducing the amount of wasted heat by transferring as much of the available low grade heat as possible to a steam Rankine power cycle.

Other objects and advantages will be apparent to those skilled in the art from the following detailed description taken in conjunction with the appended claims and drawings.

BRIEF DESCRIPTION OF THE DRAWINGS

Objects and features of this invention will be better understood from the following description taken in conjunction with the drawings, wherein.

DETAILED DESCRIPTION OF THE INVENTION

The present invention provides methods and systems for generating power that combine supercritical CO2 (SCO2)

Brayton cycle and conventional supercritical steam Rankine technology, such methods and systems being of greater or higher efficiencies than otherwise commonly attainable.

Figure 1:
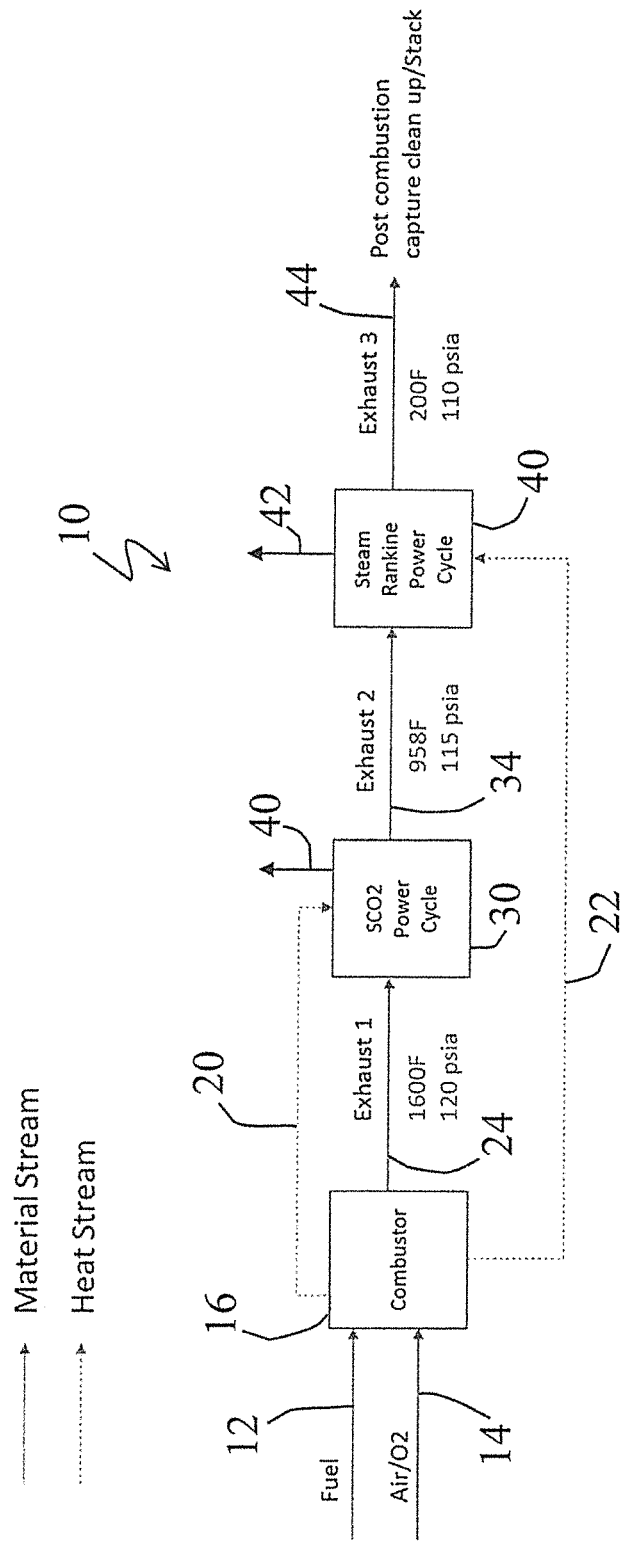
FIG. 1 is a simplified block flow diagram of a process and system in accordance with one aspect of the subject development.

FIG. 1 provides a general simplified overview of such processing and associated system in accordance with one aspect of the subject development. More specifically, FIG. 1 illustrates a simplified block flow diagram of a process and system, generally designated by the reference numeral 10, in accordance with one embodiment.

As shown, a stream of a fuel material 12 and a stream of oxidizer material 14 are fed to a combustor 16.

Suitable fuel materials for use in the subject development include fossil fuel materials, such as coal and natural gas, for example, and which fuel materials are carbonaceous.

Suitable oxidizer materials include oxygen, air and combinations thereof such oxygen-enriched air, example.

As will be appreciated by those skilled in the art and guided by the teachings herein provided, various combustor devices can be suitably employed in the practice of the subject development. In accordance with one preferred embodiment, the combustor can suitably be in the form of a fluidized bed. For example, a fluidized bed reactor such as shown and/or described in U.S. Pat. No. 9,567,876, issued 14 Feb. 2017 and herein incorporated in its entirety by reference, can be advantageously utilized in the practice of the subject development. In general, suitable combustor devices include combustor devices that could potentially provide a section with a constant heat source.

In the combustor 16, the fuel material reacts, e.g., combusts, with the oxidizer material to produce heat, shown as exiting the combustor 16 via the lines 20 and 22, respectively, and a combustion exhaust such as at 1600° F. and 120 psia, shown as exiting the combustor 16 via a line 24.

The combustion exhaust, via the line 24, and a first portion of the combustor-produced heat, via the line 20 are introduced or fed to a $SCO_2$ Brayton power cycle, designated by the reference numeral 30, to produce power, shown or represented by the arrow 32, and a second exhaust such as at 955° F. and 115 psia, shown as exiting the $SCO_2$ Brayton power cycle 30 via a line 34.

The second exhaust, via the line 34, and a second portion of the combustor-produced heat, via the line 22 are introduced or fed to a steam Rankine power cycle, designated by the reference numeral 40, to produce power, shown or represented by the arrow 42, and a third exhaust such as at 200° F. and 110 psia, shown as exiting the steam Rankine power cycle 40 via a line 44.

As shown, the third exhaust of line 44 can be passed for post combustion carbon capture clean-up; stack discharge or otherwise appropriately processed as may be desired.

Figure 2:
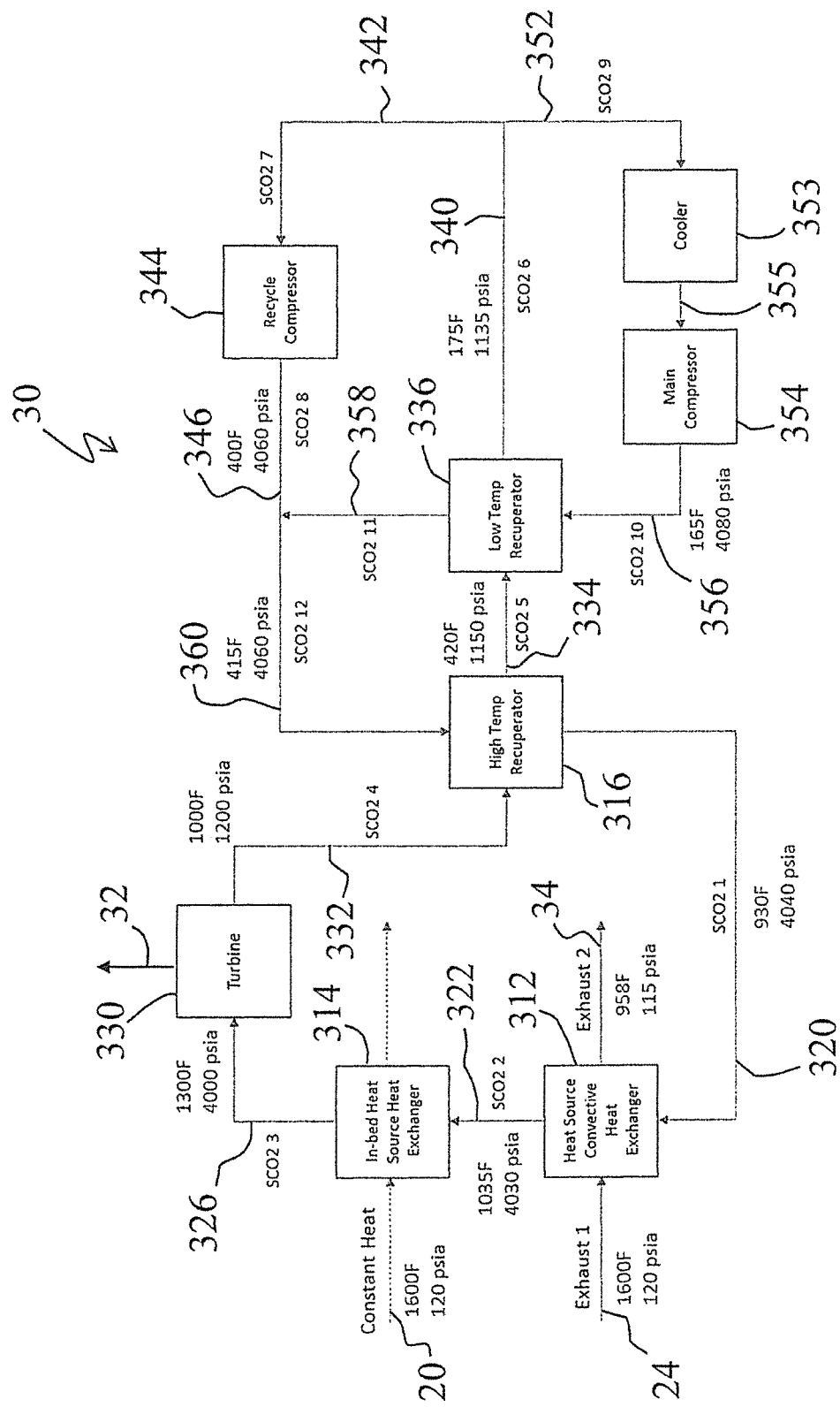
FIG. 2 is a simplified block flow diagram of a SCO2 Brayton cycle process and system in accordance with one aspect of the subject development.

Turning now to FIG. 2, there is illustrated a simplified block flow diagram showing the SCO2 Brayton power cycle 30, in greater detail in accordance with one embodiment of the subject development. More particularly, FIG. 2 shows the SCO2 Brayton power cycle 30 process and system in greater detail with emphasis on the integration of the SCO2 Brayton power cycle with the combustor for improved, increased or desirably maximized efficiency, such as where such maximized plant efficiency is a measurement of the total power output of the Brayton and steam cycles divided by the heating value from the fuel source.

As shown in FIG. 2, the SCO2 Brayton power cycle 30 employs two sources of heat: a convective heat exchanger 312 (heat available from 1600F-250F) and a direct in-bed constant temperature heat exchanger 314 (heat available at 1600° F.).

SCO2 from the high temperature recuperator 316 enters the convection heat exchanger 312 heat source via a line 320. In one embodiment, the SCO2 of the line 320 is at a temperature of 930° F. and a pressure of 4040 psia. In the heat exchanger 312, the SCO2 is passed in heat exchange communication with the combustion exhaust, such as at 1600° F. and 120 psia, introduced into the heat exchanger 312 via the line 24. Such processing forms a heated SCO2, such as at 1035° F. and 4030 psia, that is passed via a line 322 to the direct in-bed constant temperature heat exchanger 314. Such processing also results in the exhaust stream 34, e.g., such as at 955° F. and 115 psia, exiting from the heat exchanger 312.

In the in-bed heat exchanger 314, the SCO2 is passed in heat exchange communication with the first portion of the combustor-produced heat, passed to the in-bed heat exchanger 314, via the line 20 from the combustor. In one embodiment, such first portion of the combustor-produced heat is at 1600° F. and 120 psia.

SCO2 exiting from the in-bed heat exchanger 314 is passed via a line 326, such as at 1300° F. and 4000 psia. Those skilled in the art and guided by the teaching herein provided will appreciate 1300° F. is the general the current limit for high temperature, high pressure boiler tubes. Further advances in technology, however, permit utilization of SCO2 or other heat transfer materials at even higher temperatures.

The SCO2 is expanded in a turbine 330, such as attached to a generator (not shown), to create power, represented by the arrow 32.

The resulting SCO2, such as at 1000° F. and 1200 psia, is passed via a line 322 to the high temperature recuperator 316. In the high temperature recuperator 316, the SCO2 is cooled down, such as to 420° F. and 1150 psia, and passed via a line 334 to a low temperature recuperator 336 where it is cooled down further, such as to 175° F. and 1135 psia, and discharged via a line 340.

In the illustrated embodiment, the SCO2 line 340 is split to form a line 342 directed to a recycle compressor 344 and a line 352 directed to a main compressor 354.

In the recycle compressor 344, the SCO2 is compressed. The SCO2 resulting from the recycle compressor, e.g., such as compressed up to 4060 psia and at 400° F., is passed via a line 346.

Before entering the main compressor 354, the SCO2 is cooled, e.g., to 90° F., in a cooler 353. It is then passed via a line 355 to the main compressor 354. It is then compressed, e.g., up to 4080 psia, and passed via a line 356, e.g., at a temperature of 165° F. to the low temperature recuperator 336 where it is heated. The so heated SCO2 is passed via a line 358 and combined with the SCO2 stream line 346 to form a line 360, such as at 415° F. and 4060 psia. The SCO2 of the line 360 then recuperates additional heat in the high temperature recuperator 316 and is then recycled back to the heat source, e.g., the heat source convective heat exchanger 312, such as via the line 320. As evident from FIG. 2, the delta temperature required of the cycle is only from 930° F. to 1300° F. Consequently, heat source heat below 930° F. would go unused in the Brayton Cycle.

Figure 3:
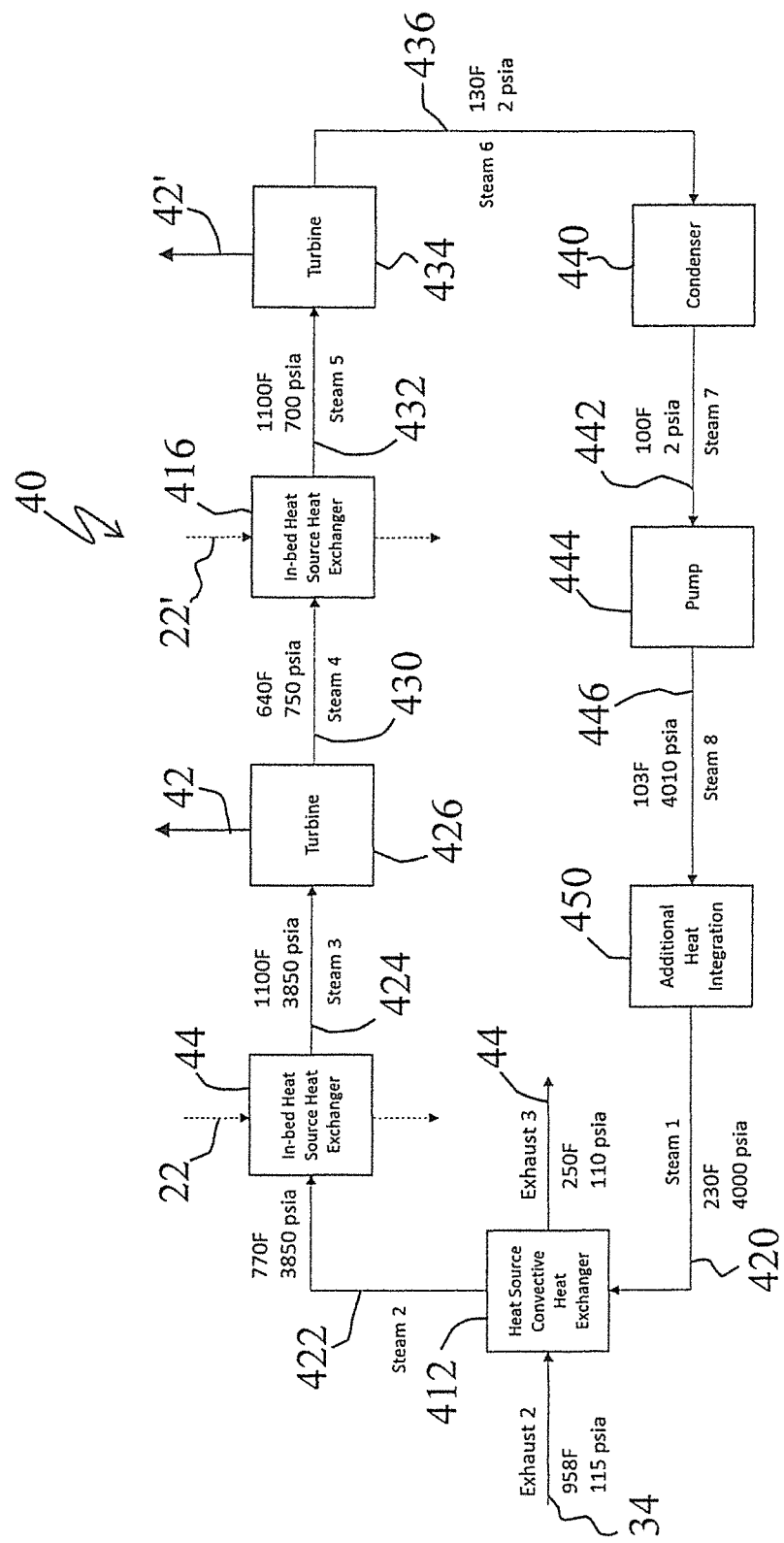
FIG. 3 is a simplified block flow diagram of a Rankine steam cycle process and system with reheat, in accordance with one aspect of the subject development.

Turning now to FIG. 3, there is illustrated a simplified block flow diagram showing the steam Rankine power cycle with reheat 40, in greater detail in accordance with one embodiment of the subject development.

As shown in FIG. 3, the steam Rankine power cycle with reheat 40 employs a convective heat exchanger 412 (heat available from 958° F.-250° F.) and two in-bed heat exchangers 414 and 416 (heat available from a constant heat source of at least 1600° F.). For example, in one embodiment, for the first in-bed heat exchanger portion, the steam flows through the tubes within the fluidized bed that take the steam from 770° F. to 1100° F., in which the steam then goes through a high pressure steam turbine. For the second in-bed heat exchanger portion, the steam goes from 640° F. to 1100° F. and is then sent through a lower pressure steam turbine.

Steam, such as at 230° F. and 4000 psia, is sent via a line 420 to the heat source convective heat exchanger 412 where it is passed in heat exchange communication with the combustion exhaust, such as at 955° F. and 115 psia, introduced into the heat exchanger 412 via the line 34. Such processing forms heated steam, such as at 770° F. and 3850 psia, which is passed via a line 422 to the in-bed heat exchanger 414. Such processing also results in the exhaust stream 44, e.g., such as at 250° F. and 110 psia, exiting from the heat exchanger 412.

In the in-bed heat exchanger 414, the steam is passed in heat exchange communication with a first part of the second portion of the combustor-produced heat, passed to the in-bed heat exchanger 414, via the line 22 from the combustor. In one embodiment, such second portion of the combustor-produced heat is at 1600° F. and 120 psia.

In the in-bed heat exchanger 414, the steam is heated such as to 1100° F.

Steam from the in-bed heat exchanger 414, such as at 1100° F. and 3850 psia, is passed via a line 424 to a first turbine 426

The steam is expanded in the turbine 426, such as attached to a generator (not shown), to create power, represented by the arrow 42.

The resulting steam, such as at 640° F. and 750 psia, is passed via a line 430 to the second in-bed heat exchanger 416 where it is passed in heat exchange communication with a second part of the second portion of the combustor-produced heat 22', passed to the in-bed heat exchanger 416 from the combustor. In one embodiment, such second portion of the combustor-produced heat is at 1600° F. and 120 psia.

Steam from the second in-bed heat exchanger 416 is passed via a line 432, such as at 1100° F. and 700 psia, to a second turbine 434. The steam is expanded in the turbine 434, such as attached to a generator (not shown), to create power, represented by the arrow 42'.

The resulting steam, such as at 130° F. and 2 psia, is passed via a line 436 to a condenser 440 where the material is appropriately condensed.

The resulting condensed material, such as at 100° F. and 2 psia, is passed via a line 442 to a pump 444. At the pump 444, the material is appropriately pressurized and passed via a line 446, such as at 103° F. and 1010 psia, for additional system heat integration processing 450 and such as to result in the line 420 steam.

As evident from FIG. 3, the temperature range of heat required for the steam cycle is from 230° F. to 1100° F.; thus the lower grade heat from the fossil heat source that could not be used in the Brayton cycle can be advantageously applied to the steam cycle instead.

In one embodiment of the subject development, 81% of the heat available in the in-bed heat exchanger was used for the SCO2 Brayton cycle, while 19% was used for the steam cycle. Further, 54% of the heat available in the convective heat exchanger was used for the SCO2Brayton cycle, while 46% was used for the steam cycle.

In accordance with a preferred aspect of the subject development and different from other technologies in which a steam Rankine cycle is used as a bottoming cycle, the subject development utilizes both SCO2 Brayton and steam Rankine power cycles that are directly heated by the heat source. More particularly and as shown, the two power cycles can desirably be heated in parallel in the in-bed heat exchanger and in series in the convective portion of the heat exchanger.

Thus, at least one aspect of the subject development provides an improved power cycle that provides a higher net plant efficiency.

Those skilled in the art and guided by the teachings herein provided will understand and appreciate that the subject development may be suitably practiced in a variety of contexts including, for example, embodiments utilizing oxygen as the oxidizer and involving capture of carbon for sequestration. In accordance with one aspect of the subject development, such specific plant would have a higher efficiency than a conventional steam Rankine plant with carbon capture.

At least one aspect of the subject development provides an improved power cycle that provides a higher net plant efficiency.

Thus, systems and processing in accordance with at least one aspect of the subject invention development can desirably produce or result in higher net plant efficiency, as compared to current state of the art technology for fossil fuel power plants.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for generating power, the method comprising:
   combusting a fuel material with an oxidizer material in a combustor to produce heat and a combustion exhaust;
   separating the heat from the combustor into a first portion of heat produced by the combustion and a second portion of heat produced by the combustion;
   feeding at least a portion of the combustion exhaust and the first portion of heat directly to a $SCO_2$ Brayton power cycle to produce power and a second exhaust;
   feeding at least a portion of the second exhaust to a steam Rankine power cycle to produce heated steam and a third exhaust;
   feeding the second portion of heat directly to the steam Rankine power cycle to produce higher temperature steam from the heated steam; and
   introducing the higher temperature steam into a turbine to produce additional power.

2. The method of claim 1 wherein the fuel material comprises a fossil fuel material.

3. The method of claim 2 wherein the fossil fuel material is coal or natural gas.

4. The method of claim 1 wherein the feeding of the at least a portion of the combustion exhaust and the first portion of the heat to the $SCO_2$ Brayton power cycle to produce the power and the second exhaust comprises: introducing high temperature SCO2 into a SCO2 turbine to produce the power and a high temperature SCO2 turbine exhaust; and recouping at least a portion of a heat from the high temperature SCO2 turbine exhaust.

5. The method of claim 4 wherein the high temperature SCO2 is formed by a method comprising: introducing SCO2 into heat exchange communication with the at least a portion of the combustion exhaust to form heated SCO2; and introducing the heated SCO2 into heat exchange communication with the first portion of heat produced to form the high temperature SCO2.

6. The method of claim 4 wherein heat from the high temperature SCO2 turbine exhaust is recouped in the form of SCO2 at a temperature of at least 900° F.

7. The method of claim 6 wherein the SCO2 at a temperature of at least 900° F. is heated to a temperature of up to 1300° F. prior to introduction into the SCO2 turbine.

8. The method of claim 7 wherein the SCO2 at a temperature of at least 900° F. is heated in part by heat exchange communication with the combustion exhaust.

9. The method of claim 8 wherein the SCO2 at a temperature of at least 900° F. is heated by a method comprising:

introducing the SCO2 at a temperature of at least 900° F. into heat exchange communication with the at least a portion of the combustion exhaust to form heated SCO2; and introducing the heated SCO2 into heat exchange communication with the first portion of heat produced to form the high temperature SCO2.

10. The method of claim 1 wherein the turbine expands the higher temperature steam at high temperature and high pressure to produce the additional power and a steam product at lower temperature and lower pressure; and repressurizing and reheating the steam product to at least in part to form the heated steam by heat exchange communication with the second exhaust.

11. The method of claim 10 wherein the heated steam is produced at least in part by heat exchange communication with the second exhaust.

12. The method of claim 1 wherein the second portion of heat produced does not feed through the $SCO_2$ Brayton power cycle.

13. The method of claim 1, further comprising: heating a turbine steam discharge produced by the turbine with a second part of the second portion of heat to produce a reheated steam; and introducing the reheated steam into a second turbine to produce a second additional power.

14. A method for generating power, the method comprising:

combusting a fuel material with an oxidizer material in a fluidized bed combustor to produce combustion heat and a combustion exhaust;

heating SCO2 with at least a portion of the combustion exhaust in a first convective heat exchanger of a SCO2 Brayton power cycle to form heated SCO2 and a second exhaust; further heating the heated SCO2 with a first portion of the combustion heat in a first in-bed heat exchanger to form higher temperature SCO2;

introducing the higher temperature SCO2 into a first turbine to produce power and a turbine SCO2 discharge; recycling the turbine SCO2 discharge from the turbine back to the first convective heat exchanger;

feeding at least a portion of the second exhaust to a second convective heat exchanger of a steam Rankine power cycle to produce heated steam and a third exhaust;

further heating the heated steam with a second portion of the combustion heat in a second in-bed heat exchanger of the steam Rankine power cycle to produce higher temperature steam;

introducing the higher temperature steam into a second turbine to produce additional power and a turbine steam discharge; and recycling the turbine steam discharge from the second turbine back to the second convective heat exchanger.

15. The method of claim 14 wherein the second portion of the combustion heat does not feed through the $SCO_2$ Brayton power cycle.

* * * * *

UNITED STATES PATENT AND TRADEMARK OFFICE
CERTIFICATE OF CORRECTION

PATENT NO. : 11,098,615 B2
APPLICATION NO. : 15/711606
DATED : August 24, 2021
INVENTOR(S) : Megan Huang et al.

It is certified that error appears in the above-identified patent and that said Letters Patent is hereby corrected as shown below:

On the Title Page

Replace item (57), "ABSTRACT: Methods and systems of power generation that integrate SCO2 Brayton and Rankin steam power cycles with fossil fuel combustion. One such method involves combusting a fuel material with an oxidizer material in a combustor to produce heat and a combustion exhaust. At least a portion of the combustion exhaust and a first portion of heat produced by the combustion processing are fed to a SCO2 Brayton power cycle to produce power and a second exhaust. At least a portion of the second exhaust and a second portion of heat produced by the combustion processing are feed to a steam Rankine power cycle to produce additional power and a third exhaust." with --ABSTRACT: Methods and systems of power generation that integrate SCO2 Brayton and Rankine steam power cycles with fossil fuel combustion. One such method involves combusting a fuel material with an oxidizer material in a combustor to produce heat and a combustion exhaust. At least a portion of the combustion exhaust and a first portion of heat produced by the combustion processing are fed to a SCO2 Brayton power cycle to produce power and a second exhaust. At least a portion of the second exhaust and a second portion of heat produced by the combustion processing are fed to a steam Rankine power cycle to produce additional power and a third exhaust.--

Signed and Sealed this
Nineteenth Day of November, 2024

Katherine Kelly Vidal
*Director of the United States Patent and Trademark Office*